US005890745A

United States Patent [19]

Kovacs

[11] Patent Number: 5,890,745

[45] Date of Patent: Apr. 6, 1999

[54] MICROMACHINED FLUIDIC COUPLER

[75] Inventor: Gregory T. A. Kovacs, Stanford, Calif.

[73] Assignee: The Board of Trustees of the Leland Stanford Junior University, Stanford, Calif.

[21] Appl. No.: 790,101

[22] Filed: Jan. 29, 1997

[51] Int. Cl.[6] .......... F16L 35/00

[52] U.S. Cl. .......... 285/24; 285/21.1; 285/382; 285/911; 285/915; 285/423; 29/447; 29/592.1; 205/666; 428/167

[58] Field of Search .......... 285/24, 21.1, 382, 285/334.4, 911, 915, 423; 428/167; 205/665, 666, 656, 603; 204/224 M, 601; 29/25.01, 25.02, 447, 592.1

[56] References Cited

U.S. PATENT DOCUMENTS

| | | | |
|---|---|---|---|
| 3,243,207 | 3/1966 | Carpenter et al. | 285/382 |
| 4,043,883 | 8/1977 | Westerheide | 205/666 |
| 4,836,888 | 6/1989 | Nojiri et al. | 205/66 |
| 4,908,112 | 3/1990 | Pole | 204/601 |
| 5,376,252 | 12/1994 | Ekstrom et al. | 204/603 |
| 5,391,269 | 2/1995 | Fiering et al. | 205/666 |
| 5,443,890 | 8/1995 | Ohman | 428/167 |
| 5,500,270 | 3/1996 | Langdon et al. | 428/167 |
| 5,565,084 | 10/1996 | Lee et al. | 205/666 |
| 5,614,076 | 3/1997 | Brophy et al. | 205/666 |
| 5,681,448 | 10/1997 | Uchiyama et al. | 205/656 |

FOREIGN PATENT DOCUMENTS

| | | | |
|---|---|---|---|
| 228427 | 8/1944 | Switzerland | 285/911 |

*Primary Examiner*—Dave W. Arola
*Attorney, Agent, or Firm*—Lumen Intellectual Property Services

[57] ABSTRACT

A method for producing a microfluidic coupler includes the step of producing a first mask on a top surface of a wafer. The first mask defines an insertion channel pattern selected to correspond to the cross sectional shape of a capillary. The wafer is etched through the first mask to form an insertion channel. A second mask is produced on a bottom surface of the wafer. The second mask defines a subchannel pattern selected to match the diameter of the bore of the capillary. The wafer is etched through the second mask to form a subchannel connected to the insertion channel. The capillary is inserted into the insertion channel such that the capillary is in fluid communication with the subchannel. In one embodiment, a capillary guide is secured to the wafer to facilitate insertion of the capillary into the insertion channel. The capillary guide has a tapered guide channel aligned with the insertion channel for guiding the capillary into the insertion channel.

56 Claims, 10 Drawing Sheets

MICROMACHINED FLUIDIC COUPLER

BACKGROUND

1. Field of the Invention

The present invention relates to the field of miniaturized systems, and in particular to a method for producing a micromachined fluidic coupler for use in a miniaturized system.

2. Description of Prior Art

In recent years, there has been a great deal of interest and effort in the development of miniaturized chemical, electrochemical, and biological systems. One of the overall goals of this work is to develop an entire "system-on-a-chip" that performs sample preparation, sample transfer, sample analysis, and other related functions. Research teams at several locations have already developed many of the functional building blocks necessary for such a system, such as chemical sensors, valves, pumps, pressure sensors, etc.

Despite the development of these building blocks, a key limiting factor to successful systems integration has emerged: the lack of suitable microfluidic couplers for establishing fluidic connections in such systems. In order to assemble a system from discrete elements or simply to couple fluids into and out of a monolithic system, suitable microfluidic couplers are required.

The results of conventional methods for producing microfluidic couplers are shown in FIGS. 1–2. These conventional methods typically include the steps of etching an insertion channel 116 in the top surface of a substrate 102, bonding a cover 100 to the top surface, and inserting a capillary 114 into insertion channel 116. The etching step is typically performed using a conventional etching technique, such as crystal plane dependent etching, isotropic etching, or anisotropic dry etching.

Unfortunately, it is difficult to form an insertion channel having a correctly shaped cross section for receiving a capillary using these conventional etching techniques. Crystal plane dependent etching forms an insertion channel having a triangular cross section 104. Isotropic etching forms an insertion channel having a roughly semi-circular cross section 106. Anisotropic dry etching forms an insertion channel having a rectangular cross section 108. Because most capillaries are circular in cross section, they cannot be properly fitted to these insertion channels. Instead, an adhesive must be used to seal a gap 112 between capillary 114 and insertion channel 116, as shown in FIG. 2. Use of an adhesive to seal gap 112 hinders system performance and renders the connection between the capillary and insertion channel permanent rather than interchangeable.

An example of such a microfluidic coupler is described in Reay et al. "Microfabricated Electrochemical Detector for Capillary Electrophoresis", Proceedings of the Solid-State Sensor and Actuator Workshop, Hilton Head, S.C., Jun. 13–16, 1994, pp. 61–64. Reay describes the use of anisotropic dry etching to form a square or rectangular insertion channel in the top surface of a silicon substrate. A glass cover is then bonded to the substrate to seal the channel. Next, a capillary tube is inserted and sealed in the channel using an epoxy.

Another method for forming a microfluidic coupler includes the step of isotropically etching the top surfaces of two substrates to form in each substrate an approximately hemi-cylindrical channel. The two substrates are then bonded together with their respective channels aligned to form a somewhat cylindrical insertion channel. In practice, however, such channels are seldom perfectly cylindrical, and thus a good fit to the capillary is still difficult to achieve.

Another disadvantage of these conventional methods for producing microfluidic couplers is that they do not allow for the precise formation of subchannels in the substrate. To eliminate dead space in the microfluidic coupler, the insertion channel should terminate in a subchannel having a diameter that precisely matches the diameter of a bore of the capillary. Attempts to form matching subchannels using conventional etching techniques are generally unsuccessful. As a result, these conventional methods produce microfluidic couplers having geometric imperfections and potential dead spaces which can trap samples or reagents and disrupt fluid flow patterns.

OBJECTS AND ADVANTAGES OF THE INVENTION

In view of the above, it is an object of the present invention to provide a method for producing a microfluidic coupler that allows for the precise fitting of a capillary to an insertion channel. It is another object of the invention to provide a method for producing a microfluidic coupler that allows for the formation of a subchannel having a diameter which precisely matches the bore of the capillary. A further object of the invention is to provide a method for producing a microfluidic coupler that allows for the interchanging of capillaries between insertion channels.

These and other objects and advantages will become more apparent after consideration of the ensuing description and the accompanying drawings.

SUMMARY OF THE INVENTION

The invention presents a method for producing a microfluidic coupler. The method includes the step of producing a first mask on a top surface of a wafer, typically a silicon substrate. The first mask defines an insertion channel pattern selected to correspond to the cross sectional shape of a capillary. The wafer is etched through the first mask to form an insertion channel in the wafer.

The method also includes the step of producing a second mask on a bottom surface of the wafer. The second mask defines a subchannel pattern selected to match the diameter of a bore of the capillary. The wafer is etched through the second mask to form a subchannel in the wafer. The insertion channel and subchannel are formed in the wafer such that the insertion channel terminates in the subchannel. In the preferred embodiment, the insertion channel and subchannel are also formed such that the subchannel is substantially coaxial with the insertion channel.

The method further includes the step of inserting the capillary into the insertion channel such that the capillary is in fluid communication with the subchannel. In a particularly advantageous embodiment, a capillary guide is secured to the wafer to facilitate insertion of the capillary into the insertion channel. The capillary guide has a tapered guide channel aligned with the insertion channel for guiding the capillary into the insertion channel.

DESCRIPTION

Figure 6:
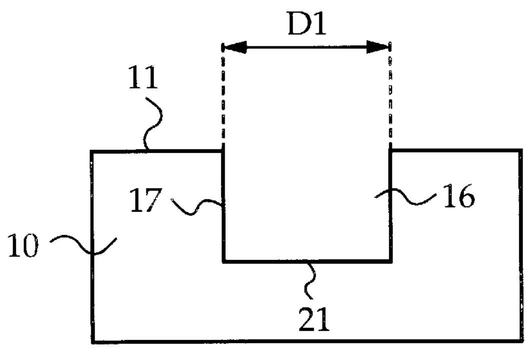
FIG. 6 is a cross sectional view of the wafer of FIG. 3 taken along the line A–A' in FIG. 3 after an etching step according to the invention.
Figure 7:
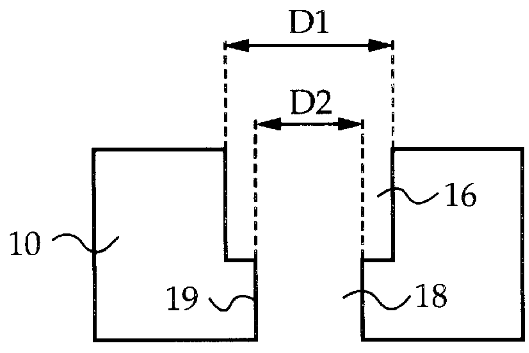
FIG. 7 is a cross sectional view of the wafer of FIG. 3 taken along the line A–A' in FIG. 3 after another etching step according to the invention.
Figure 8:
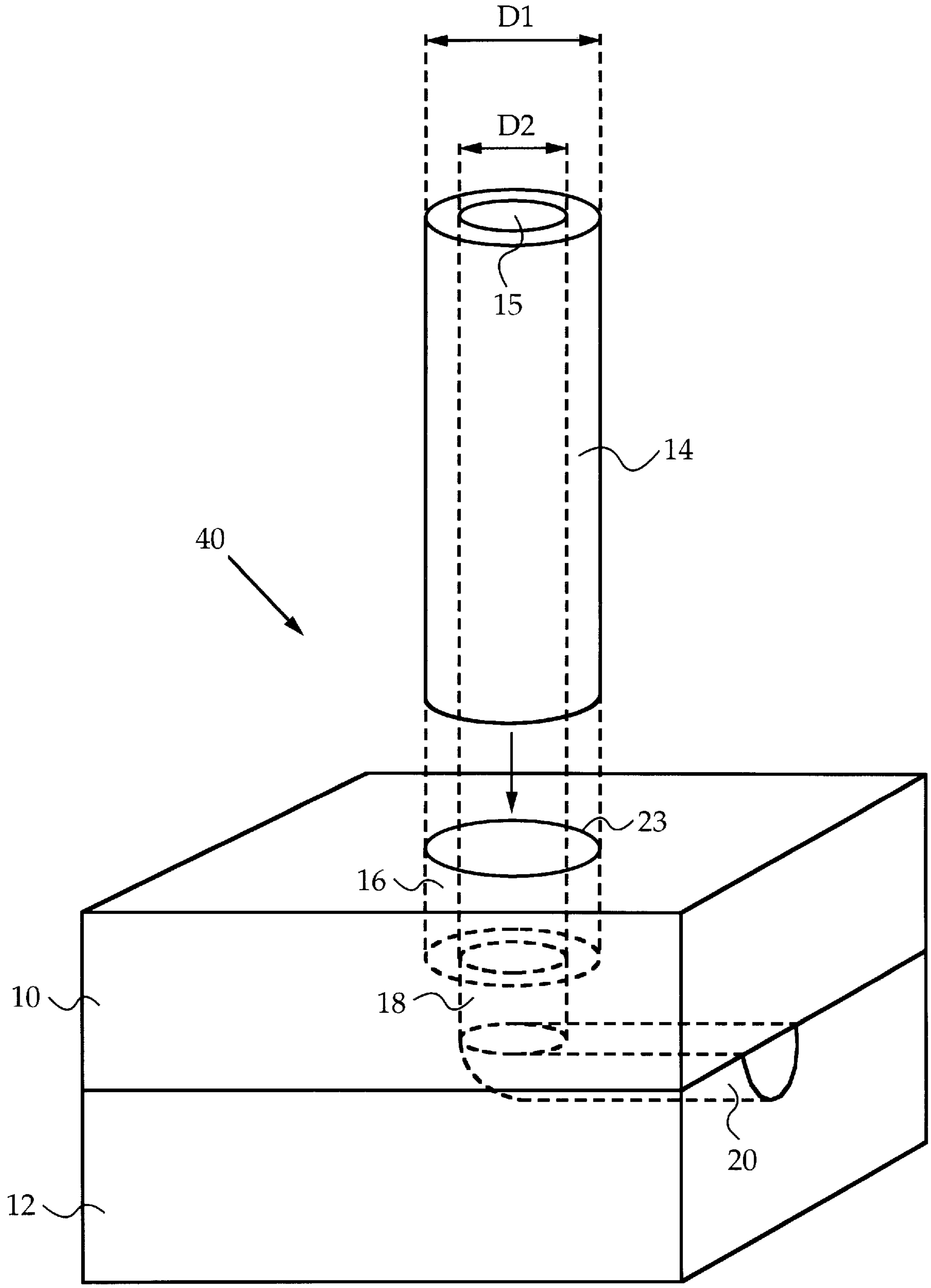
FIG. 8 is a three dimensional, schematic view of a microfluidic coupler according to the invention.

A preferred embodiment of the invention is illustrated in FIGS. 3–8. Referring to FIG. 8, a microfluidic coupler 40 includes a wafer 10 having an insertion channel 16. Insertion channel 16 has a diameter D1 which corresponds to the outer diameter of a capillary 14 such that capillary 14 fits snugly into channel 16. Insertion channel 16 terminates in a subchannel 18 which is coaxial with channel 16. Subchannel 18 has a diameter D2 matching the diameter of a central bore 15 of capillary 14, eliminating dead space and permitting smooth fluid flow between capillary 14 and subchannel 18. Wafer 10 is bonded to an underlying substrate 12. Substrate 12 has an etched fluid channel 20 in fluid communication with subchannel 18, allowing fluid transfer between capillary 14 and substrate 12 through wafer 10.

The specific dimensions of insertion channel 16 and subchannel 18 are independently controlled in the production of microfluidic coupler 40 to correspond to the dimensions of capillary 14. It is to be understood that the dimensions described in the preferred embodiment are for illustrative purposes only. The actual dimensions of insertion channel 16 and subchannel 18 are selected to correspond to the dimensions of capillary 14, which may be varied to tailor microfluidic coupler 40 to a specific application. Additionally, the preferred embodiment describes etching insertion channel 16 before etching subchannel 18. This particular order of etching is also for illustrative purposes. In alternative embodiments, subchannel 18 may be etched before insertion channel 16.

Figure 1:
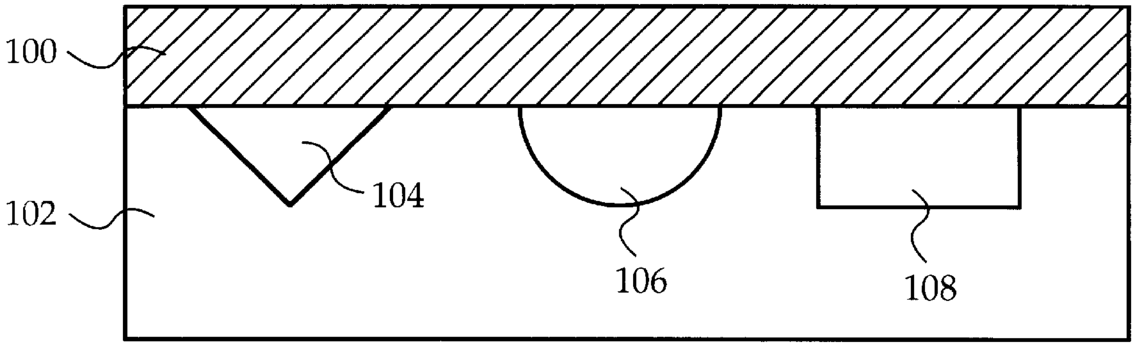
FIG. 1 (PRIOR ART)
FIG. 1 is a cross sectional view of three insertion channels formed using conventional etching techniques.
Figure 2:
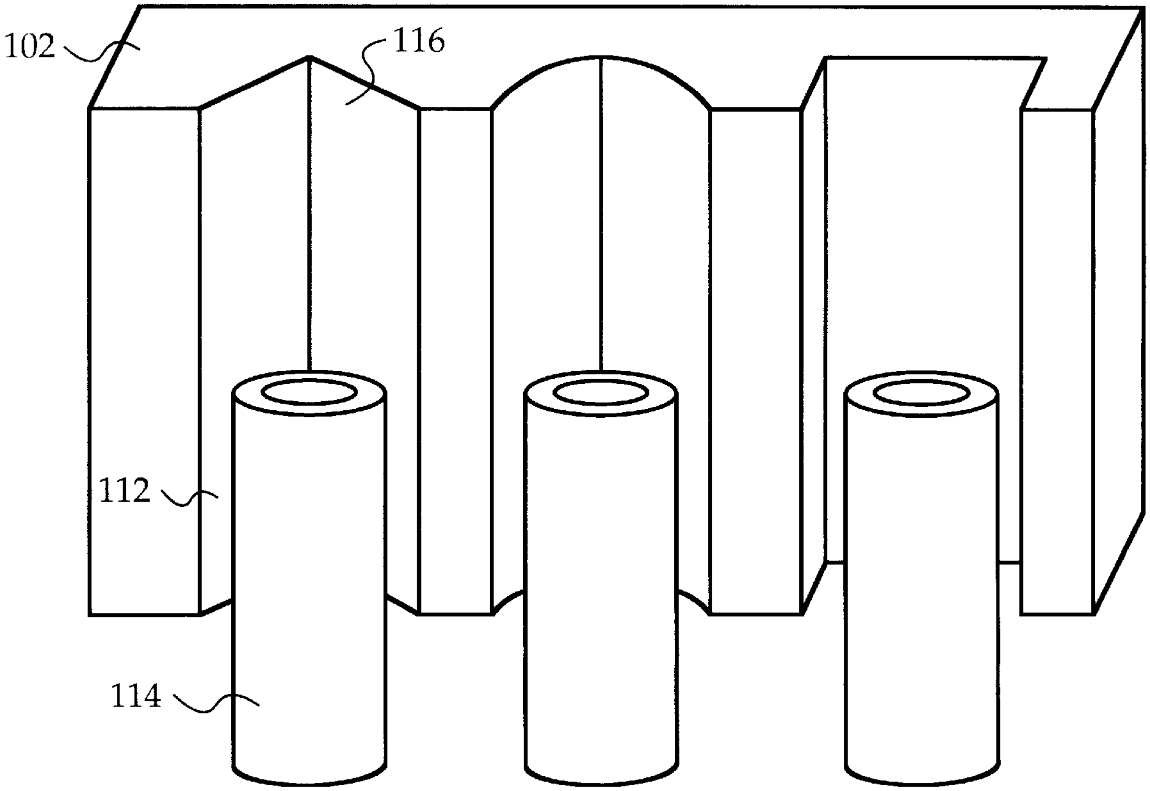
FIG. 2 (PRIOR ART)
FIG. 2 is a perspective view of three capillaries being inserted into the insertion channels of FIG. 1.
Figure 3:
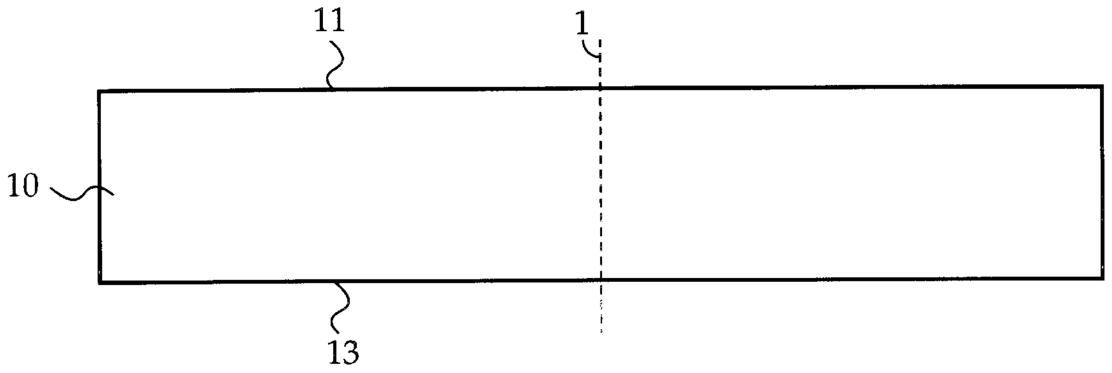
FIG. 3 is a side view of a wafer.
Figure 4:
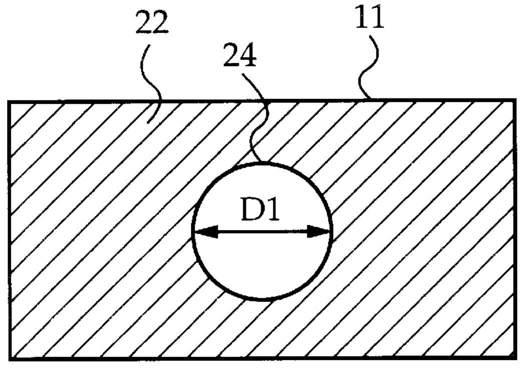
FIG. 4 is a plan view of a first mask defining an insertion channel pattern on a top surface of the wafer of FIG. 3.

FIG. 3 illustrates a side view of wafer 10 before insertion channel 16 and subchannel 18 are formed. Wafer 10 is typically a silicon substrate having a standard thickness of 500 $\mu$m. of course, wafers that are thicker than 500 $\mu$m may be used in alternative embodiments. Wafer 10 has a top surface 11 and a bottom surface 13. Using conventional lithographic techniques, a first mask 22 is produced on top surface 11, as shown in FIG. 4. Mask 22 defines an insertion channel pattern 24 of diameter D1 selected to correspond to the outer diameter of the capillary. Typically, diameter D1 is in the range of 50 to 250 $\mu$m, depending on the dimensions of the particular capillary to be fit.

In the preferred embodiment, mask 22 is produced with a layer of photoresist having a thickness of at least 8 $\mu$m for etching insertion channel 16 to a depth of 400 $\mu$m. It should be noted that some etching chemistries also require a silicon dioxide layer to be patterned and etched to form part of the masking material. Such silicon dioxide masking techniques are well known in the art. However, for the deep reactive ion etching of the preferred embodiment, photoresist is a sufficient masking material and the use of silicon dioxide is unnecessary. Preferably, another layer of photoresist is applied to bottom surface 13 to protect bottom surface 13 during the formation of insertion channel 16.

Wafer 10 is etched through mask 22 using deep reactive ion etching (DRIE) to form insertion channel 16, as illustrated in FIG. 6. Insertion channel 16 is defined by sidewalls 17 and a bottom wall 21. The DRIE is preferably performed using an inductively coupled plasma source. A suitable machine for performing DRIE in this manner is commercially available from Surface Technology Systems of the Prince of Wales Industrial Estate, Abercarn, Gwent NP1 5AR, United Kingdom.

In etching wafer 10, the etching process causes polymerization of radicals on all wafer surfaces, including sidewalls 17 and bottom wall 21. Ion bombardment in a direction substantially perpendicular to top surface 11 removes polymer from surfaces parallel to top surface 11, including bottom wall 21, leaving polymer on sidewalls 17. This polymer on sidewalls 17 slows the lateral etch rate, allowing channel 16 to be formed with an extremely high aspect ratio and with a cross sectional shape which precisely corresponds to the cross sectional shape of capillary 14. Photoresist typically has a DRIE etch selectivity of 50:1 relative to silicon, so that channel 16 may be etched to a depth of 400 $\mu$m when mask 22 has a thickness of 8 $\mu$m. Of course, channel 16 may be etched to different depths in alternative embodiments by varying the thickness of mask 22 and the duration of the etch.

Figure 5:
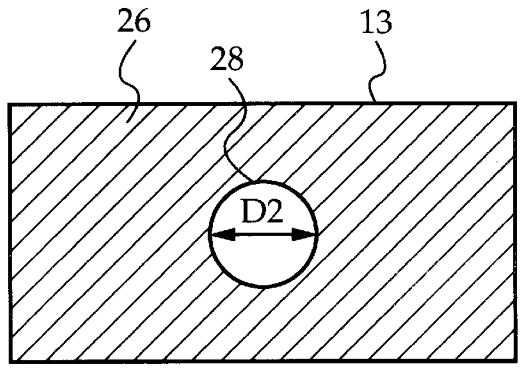
FIG. 5 is a plan view of a second mask defining a subchannel channel pattern on a bottom surface of the wafer of FIG. 3.

Subchannel 18 is formed in wafer 10 by performing masking and etching steps which are analogous to those performed to form insertion channel 16. Referring to FIG. 5, conventional lithography is used to produce a second mask 26 on bottom surface 13 of wafer 10. Mask 26 defines a subchannel pattern 28 of diameter D2 selected to match the diameter of bore 15. Typically, diameter D2 is in the range of 10 to 200 $\mu$m, depending upon the exact diameter of the bore to be matched.

Mask 26 is preferably produced with a layer of photoresist having a thickness of at least 2 $\mu$m for etching subchannel 18 to a depth of 100 $\mu$m. Of course, the thickness of mask 26 may be varied in alternative embodiments for etching subchannel 18 to different depths. In producing mask 26, subchannel pattern 28 is properly aligned with insertion channel 16 to ensure that subchannel 18 is formed coaxially with insertion channel 16. The alignment is accomplished using conventional backside alignment techniques which are well known in the art. Preferably, another layer of photoresist is applied to top surface 11, sidewalls 17, and bottom wall 21 to protect these surfaces during the formation of subchannel 18.

Wafer 10 is deep reactive ion etched through mask 26 to form subchannel 18, as shown in FIG. 7. Subchannel 18 is formed with a depth sufficient to ensure that insertion channel 16 terminates in subchannel 18. In the example of the preferred embodiment, the depth of subchannel 18 is 100 μm. The DRIE is preferably performed using an inductively coupled plasma source, as previously described in relation to the etching of insertion channel 16.

In etching wafer 10, the etching process causes polymerization of radicals on all wafer surfaces, including sidewalls 19. The polymer on sidewalls 19 slows the lateral etch rate, allowing subchannel 18 to be formed with an extremely high aspect ratio so that subchannel 18 precisely corresponds in cross sectional shape to bore 15. Following the etching of wafer 10, any remaining photoresist is removed from the surfaces of wafer 10 using oxygen plasma or wet chemical agents which are well known in the art.

Referring again to FIG. 8, the deep reactive ion etching of wafer 10 produces channels 16 and 18 with highly controlled dimensions allowing for snug insertion of capillary 14 into channel 16. Capillary 14 is inserted into channel 16 to place bore 15 in fluid communication with subchannel 18. The preferred embodiment includes an optional step of sealing capillary 14 to wafer 10 using an adhesive, preferably an epoxy or heat-melted adhesive. The adhesive is applied to wafer 10 and capillary 14 at a rim area 23 of wafer 10. When cured, the adhesive provides mechanical support for capillary 14 and improves the quality of the seal between wafer 10 and capillary 14.

In operation, microfluidic coupler 40 couples fluids into and out of a miniaturized system element, such as substrate 12. As shown in FIG. 8, substrate 12 has a fluid channel 20 etched in its top surface. The bottom surface of wafer 10 is bonded to the top surface of substrate 12 such that subchannel 18 is in fluid communication with channel 20. In one embodiment, substrate 12 is a glass substrate and the bottom surface of wafer 10 is anodically bonded to the top surface of substrate 12. Specific techniques for anodic bonding are well known in the art. For example, an explanation of anodic bonding is found in U.S. Pat. No. 3,397,279 issued to Pomerantz on Aug. 13, 1968 and in Pomerantz "Field Assisted Glass-Metal Sealing", Journal of Applied Physics, Vol. 40, 1969, p. 3946.

In another embodiment, substrate 12 is a silicon substrate, and the bottom surface of wafer 10 is fusion bonded to the top surface of substrate 12. Specific techniques for fusion bonding two silicon substrates in this manner are also well known in the art. For example, a description of fusion bonding techniques is given in Barth "Silicon Fusion Bonding for Fabrication of Sensors, Actuators, and Microstructures", Sensors and Actuators, Vol. A21–A23, 1990, pp. 919–926. Alternatively, wafer 10 may be adhesively bonded to a glass, plastic, or silicon substrate using a thin layer of adhesive, as is well known in the art.

The preferred embodiment includes an optional step of etching an additional fluid channel (not shown) in the bottom surface of wafer 10 prior to bonding wafer 10 to substrate 12. The additional fluid channel matches the hemicylindrical shape of channel 20. Wafer 10 is then bonded to substrate 12 to form a substantially cylindrical fluid channel between wafer 10 and substrate 12.

Figure 9:
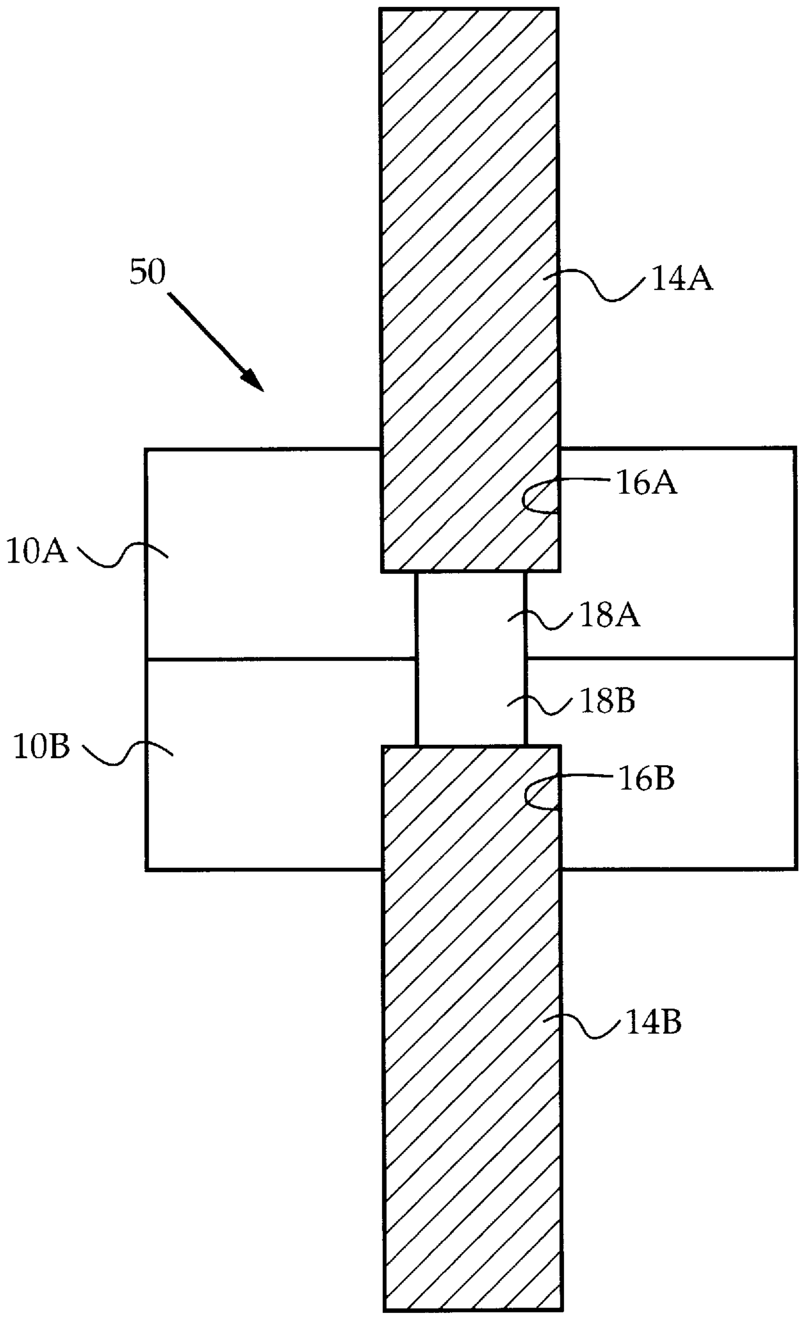
FIG. 9 is a schematic view of another microfluidic coupler according to the invention.

FIG. 9 shows a second embodiment of the invention for producing a double female microfluidic coupler 50. In the second embodiment, the same steps described with reference to FIGS. 3–8 are now performed on two wafers 10A and 10B. Following the etching of wafers 10A and 10B, wafer 10A has an insertion channel 16A terminating in a subchannel 18A. Similarly, wafer 10B has an insertion channel 16B terminating in a subchannel 18B. Wafer 10A is then fusion bonded to wafer 10B such that subchannel 18A is aligned with and in fluid communication with subchannel 18B. To complete microfluidic coupler 50, capillaries 14A and 14B are inserted in channels 16A and 16B, respectively, such that capillary 14A is in fluid communication with subchannel 18A and such that capillary 14B is in fluid communication with subchannel 18B.

Figure 11:
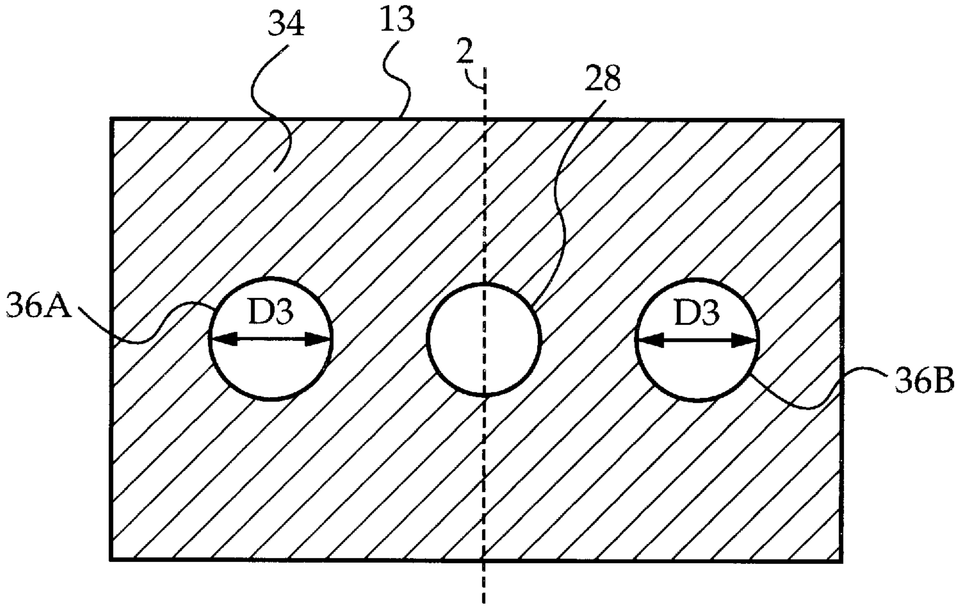
FIG. 11 is a plan view of another mask on the bottom surface of the wafer of FIG. 10.
Figure 12:
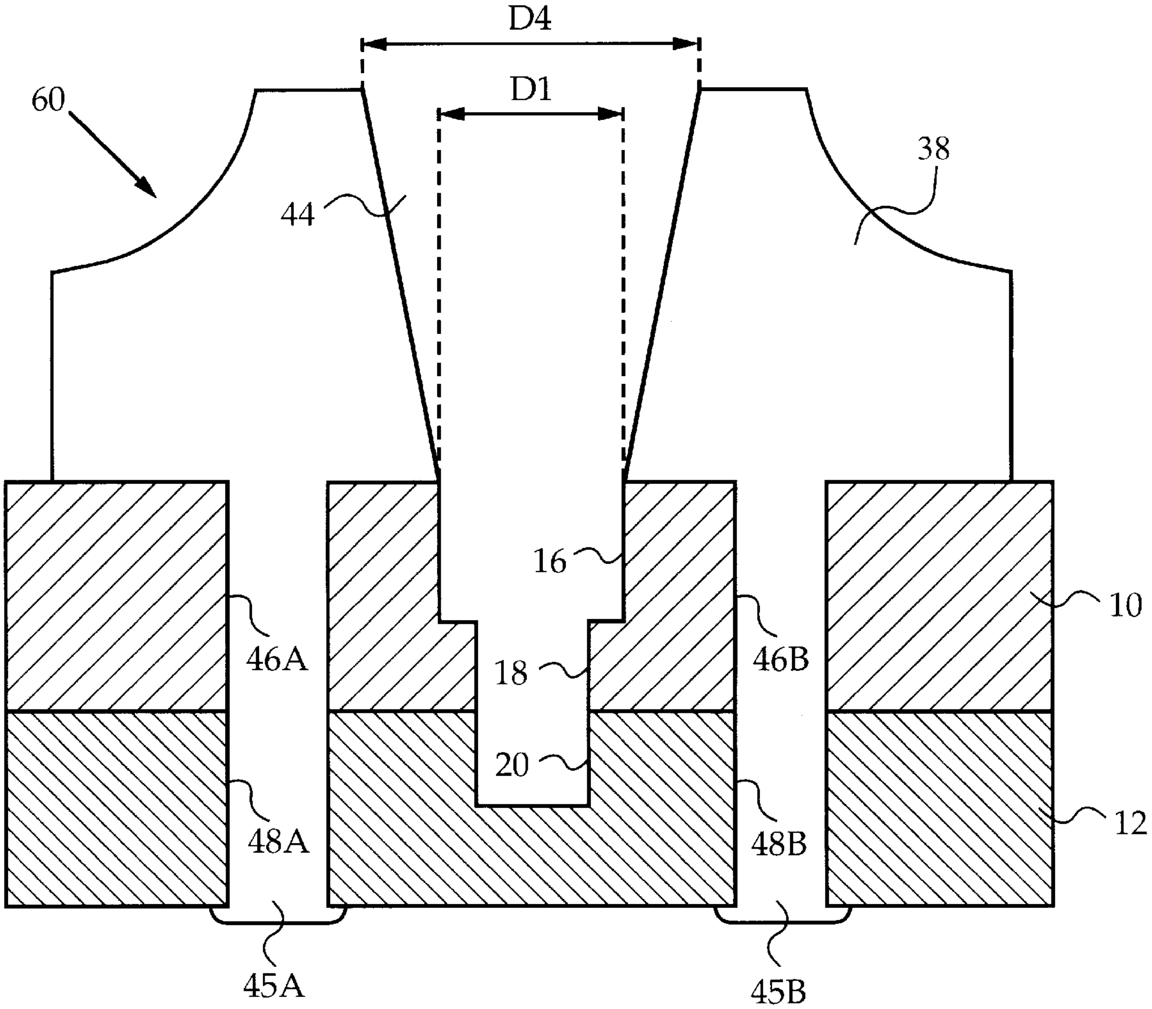
FIG. 12 is a cross sectional view of the wafer of FIG. 10 taken along the line B–B' in FIG. 10 after another etching step according to the invention.
Figure 13:
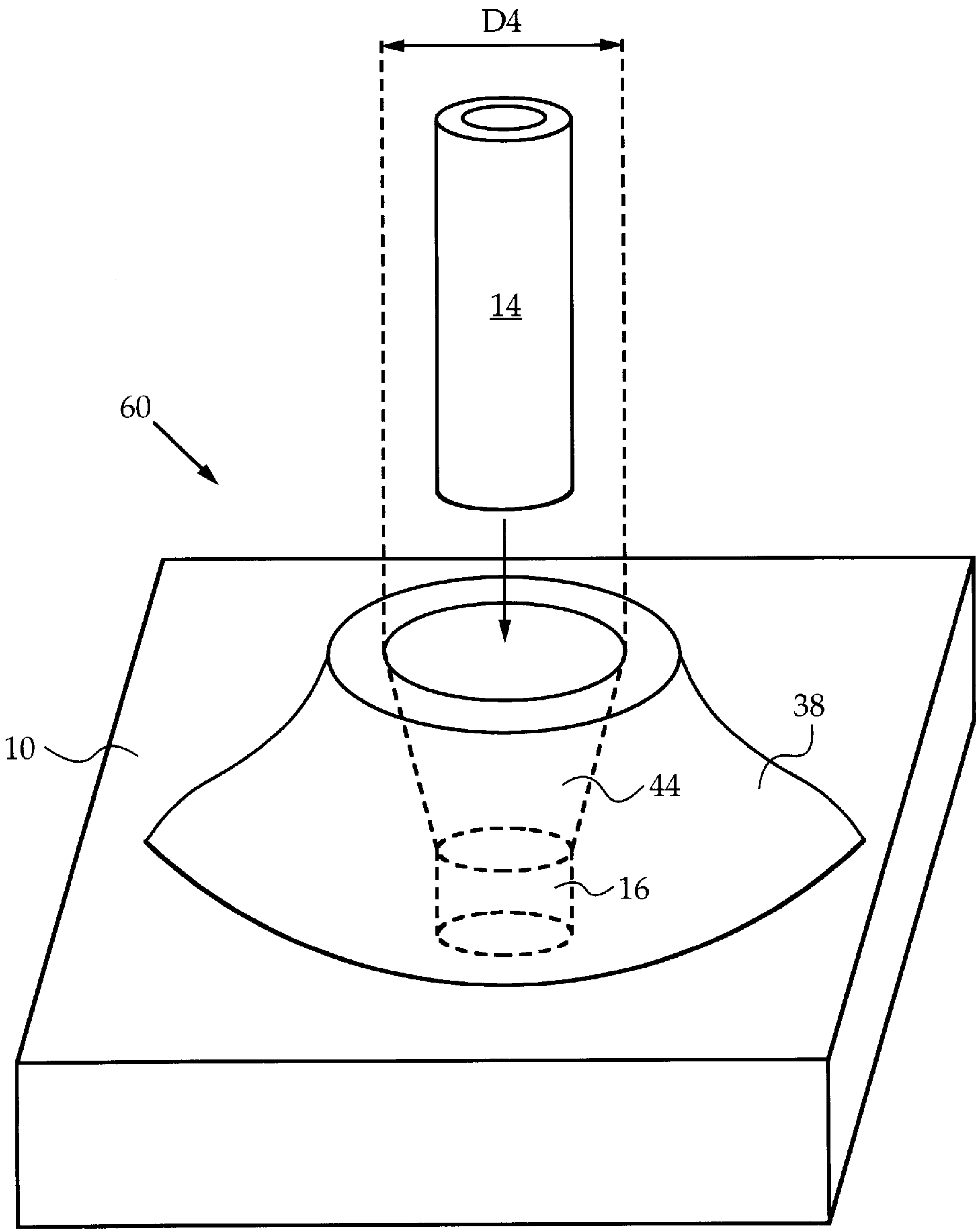
FIG. 13 is a three dimensional, schematic view of a capillary guide mounted to the wafer of FIG. 12.

FIGS. 10–13 illustrate a third embodiment of the invention which includes a capillary guide for facilitating the insertion of the capillary into the insertion channel. Referring to FIG. 13, a microfluidic coupler 60 includes a capillary guide 38 mounted to wafer 10. Capillary guide 38 has a tapered guide channel 44 for guiding capillary 14 into insertion channel 16. Guide channel 44 has an upper diameter D4 larger than the outer diameter of capillary 14 for easy insertion of capillary 14 into guide channel 44.

FIG. 12 shows a cross sectional view of microfluidic coupler 60 bonded to substrate 12. Wafer 10 has two mounting channels 46A and 46B. Substrate 12 has two corresponding mounting channels 48A and 48B. Channels 46A and 46B are aligned coaxially with channels 48A and 48B, respectively. Capillary guide 38 has a first leg 45A inserted through channels 46A and 48A and a second leg 45B inserted through channels 46B and 48B. Legs 45A and 45B secure guide 38 to wafer 10 and substrate 12. For simplicity of illustration, only two legs and two corresponding sets of mounting channels are described in this embodiment. It is obvious that any number of legs and corresponding sets of mounting channels may be used in alternative embodiments to secure capillary guide 38 to wafer 10 and substrate 12.

Guide channel 44 tapers to a lower diameter equal to diameter D1 of insertion channel 16. Guide channel 44 is in communication with and coaxial with insertion channel 16 such that channel 44 guides capillary 14 directly into insertion channel 16. Guide 38 is preferably fabricated from plastic, although other materials may be used in alternative embodiments. Specific techniques for fabricating plastic to controlled dimensions, such as precision injection molding, are well known in the art.

Figure 10:
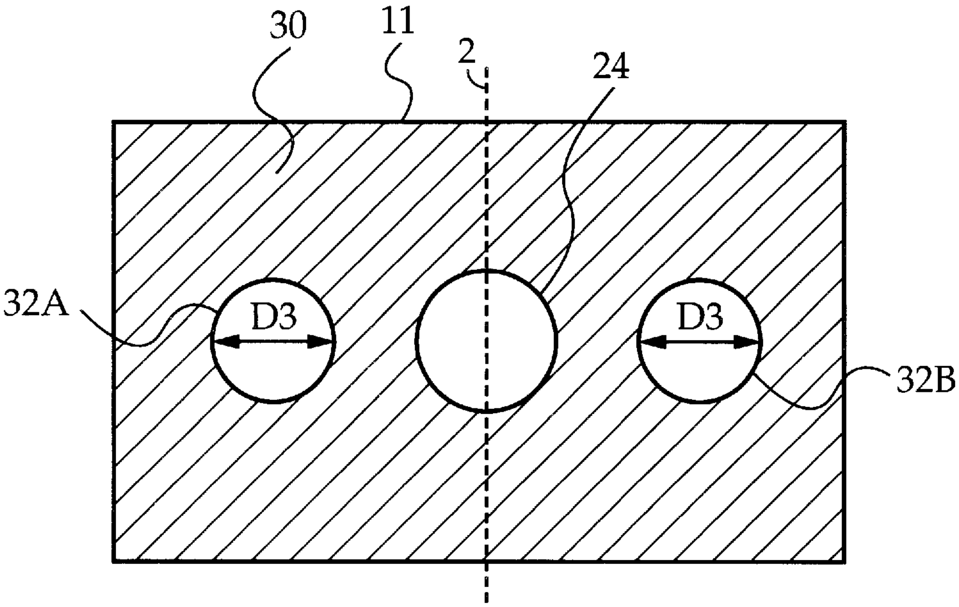
FIG. 10 is a plan view of another mask on the top surface of another wafer.

Mounting channels 46A and 46B are preferably etched in wafer 10 concurrently with the etching of insertion channel 16 and subchannel 18. This is accomplished by producing a first mask 30 on top surface 11 of the wafer, as shown in FIG. 10. Mask 30 defines insertion channel pattern 24, as described in the preferred embodiment above. Mask 30 also defines two mounting channel patterns 32A and 32B of diameter D3. As in the preferred embodiment, wafer 10 is deep reactive ion etched through mask 30 to produce insertion channel 16, as shown in FIG. 12.

Similarly, a second mask 34 is produced on bottom surface 13 of the wafer, as shown in FIG. 11. Mask 34 defines subchannel pattern 28, as described in the preferred embodiment above. Mask 34 also defines two mounting channel patterns 36A and 36B of diameter D3 which are aligned with mounting channel patterns 32A and 32B, respectively. As in the preferred embodiment, wafer 10 is deep reactive ion etched through mask 34 to produce subchannel 18, as shown in FIG. 12. The DRIE etches also produce mounting channels 46A and 46B, each having diameter D3, for receiving legs 45A and 45B, respectively, of guide 38.

Substrate 12 is etched to form channels 48A and 48B such that each channel also has diameter D3. Fluid channel 20 may be etched in substrate 12 prior to or following the etching of channels 48A and 48B. Wafer 10 is then bonded to substrate 12 such that channels 46A and 46B are in communication with and aligned coaxially with channels 48A and 48B, respectively, and such that subchannel 18 is in fluid communication with channel 20.

In one possible embodiment, substrate 12 is a glass substrate and channels 48A and 48B are formed by etching the glass substrate with hydroflouric acid. Specific techniques for etching a glass substrate in this manner are well known in the art. The glass substrate is then anodically bonded to wafer 10, as described in the preferred embodiment above. In another embodiment, substrate 12 is a silicon substrate, and channels 48A and 48B are formed by etching the silicon in a manner analogous to that described for forming channels 46A and 46B. Substrate 12 is then fusion bonded to wafer 10, as described in the preferred embodiment above.

After wafer 10 is bonded to substrate 12, legs 45A and 45B are inserted to the ends of channels 48A and 48B, respectively. The ends of legs 45A and 45B protruding from substrate 12 are then slightly melted to secure guide 38 to wafer 10 and substrate 12. Next, capillary 14 is inserted through guide channel 44 into insertion channel 16 to place capillary 14 in fluid communication with subchannel 18.

Figure 14:
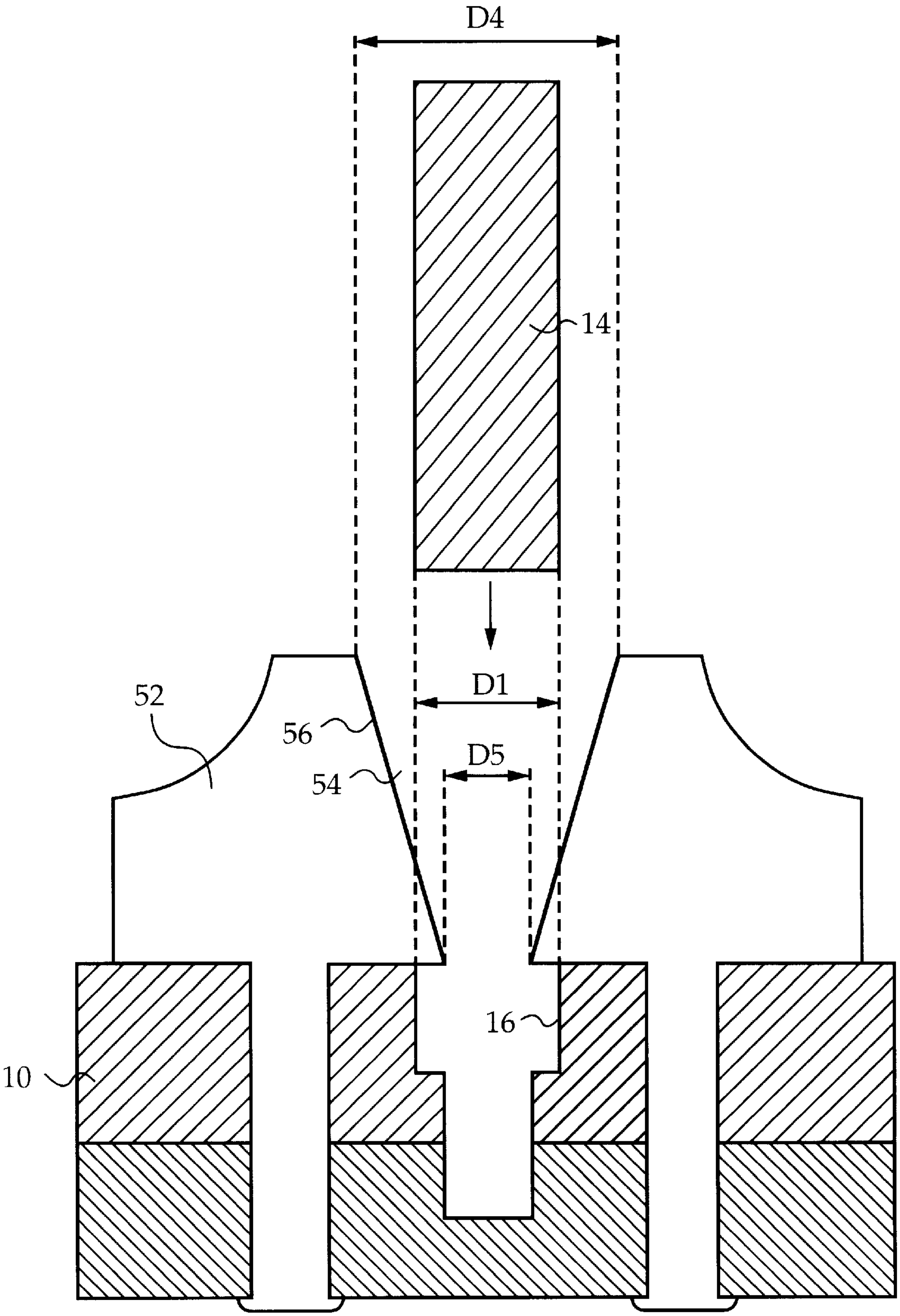
FIG. 14 is a cross sectional view of the wafer of FIG. 12 with an alternatively shaped capillary guide.

FIG. 14 shows a capillary guide 52 having an alternatively shaped guide channel 54. Channel 54 is defined by tapered sidewalls 56. Channel 54 has a lower diameter D5 which is smaller than diameter D1 of insertion channel 16. Capillary 14 is inserted into insertion channel 16 by press fitting capillary 14 through sidewalls 56, thereby forming a tight seal between capillary 14 and guide 52. The advantage of this embodiment is that guide 52 provides a convenient mechanism for sealing capillary 14 in insertion channel 16.

Figure 15:
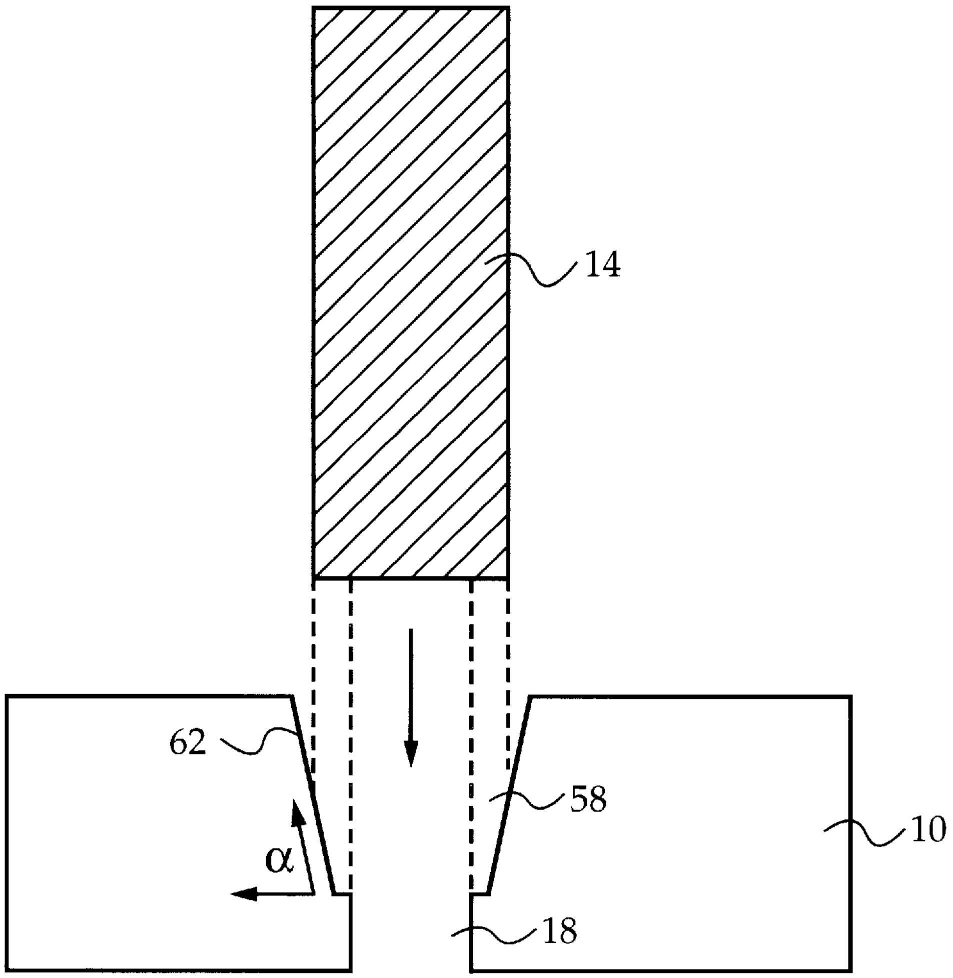
FIG. 15 is a schematic view of a capillary being inserted into an alternatively shaped insertion channel according to another method of the invention.

A fourth embodiment of the invention is shown in FIG. 15. In this embodiment, wafer 10 is etched to form an insertion channel 58 defined by tapered sidewalls 62. Sidewalls 62 taper at an angle $\alpha$, preferably 70° to 85°. Capillary 14 is inserted into channel 58 by press fitting capillary 14 between sidewalls 62. Specific techniques for adjusting the DRIE etch parameters to form sidewalls 62 in this manner are well known in the art. For example, techniques for controlling the angle of a reactive ion etch process are described in Elwenspoek et al. "The Black Silicon Method VI: High Aspect Ratio Trench Etching for MEMS Applications", Proceedings of IEEE International Workshop on Micro Electro Mechanical Systems, San Diego, Calif., Feb. 11–15, 1996, pp. 250–257.

Figure 16:
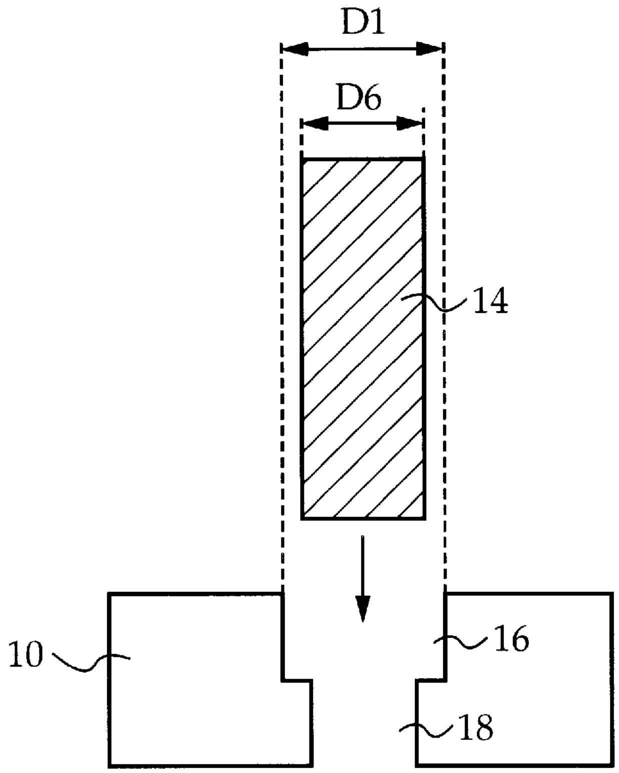
FIG. 16 is a schematic view of another capillary being inserted into another insertion channel according to another method of the invention.
Figure 17:
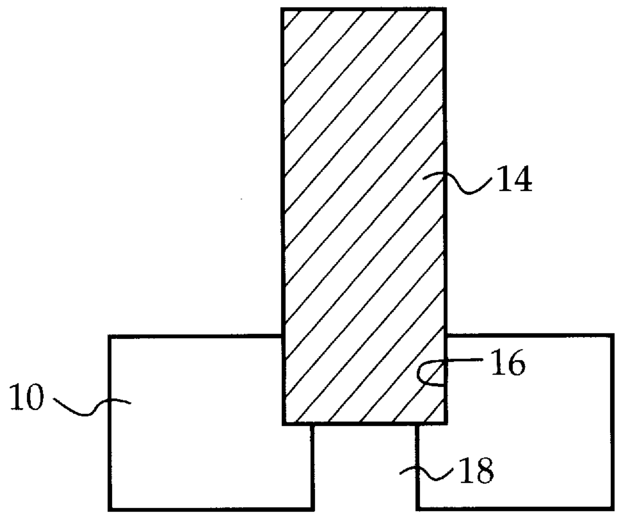
FIG. 17 is a schematic view of the capillary of FIG. 16 sealed in the insertion channel of FIG. 16 according to the invention.

FIGS. 16–17 show another method for inserting capillary 14 into insertion channel 16. The method includes the step of thermally contracting capillary 14 until its outer diameter is smaller than diameter D1 of insertion channel 16. Capillary 14 is thermally contracted by cooling capillary 14 with liquid nitrogen or a similar cooling source, preferably to a temperature of about −200° C.

Referring to FIG. 16, capillary 14 thermally contracts to an outer diameter D6 which is preferably 2 to 10 $\mu$m smaller than diameter D1 of insertion channel 16. Of course, to achieve this thermal contraction of capillary 14, the capillary must be made of a material having a sufficiently high thermal expansion coefficient, preferably 100 ppm/°C. or greater. Suitable capillary materials having a thermal expansion coefficients of 100 ppm/°C. or greater include polyimides and polycarbonates.

When capillary 14 is sufficiently contracted, it is inserted into insertion channel 16. After inserting capillary 14 into channel 16, capillary 14 is thermally expanded, typically by allowing capillary 14 to reach room temperature, e.g. 15° to 27° C. Referring to FIG. 17, the thermal expansion of capillary 14 within insertion channel 16 forms a tight seal between wafer 10 and capillary 14. A similar procedure may be used to interchange capillary 14 between channel 16 and another insertion channel in the miniaturized system.

In a particularly advantageous embodiment, insertion channel 16 is formed such that diameter D1 is equal to or slightly smaller than the outer diameter of capillary 14 before capillary 14 is thermally contracted. Capillary 14 is then cooled as previously described to allow insertion of capillary 14 into channel 16. As capillary 14 returns to room temperature, capillary 14 thermally expands within channel 16 to form a gas tight seal with wafer 10.

SUMMARY, RAMIFICATIONS, AND SCOPE

Although the above description contains many specificities, these should not be construed as limitations on the scope of the invention, but merely as illustrations of some of the presently preferred embodiments. Many other embodiments of the invention are possible. For example, the guide for facilitating the insertion of the capillary need not be plastic. In an alternative embodiment, a metal guide is created by electroplating nickel or chrome onto the wafer.

Additionally, all dimensions stated are exemplary of just one possible embodiment. The exact dimensions of each component of the microfluidic coupler may be varied to tailor the coupler to the specific application required. Further, the method of the invention has been described in relation to silicon substrates due to the predominant use of silicon in current miniaturized systems. It is to be understood that the method of the invention may also be applied to other materials as DRIE or other suitably anisotropic etches are developed for these materials.

Therefore, the scope of the invention should be determined by the following claims and their legal equivalents.

What is claimed is:

1. A method for producing a microfluidic coupler, said method comprising the following steps:

a) providing a wafer having a top surface and a bottom surface;

b) producing a first mask on said top surface, said first mask defining an insertion channel pattern;

c) etching said wafer through said first mask to form an insertion channel in said wafer;

d) producing a second mask on said bottom surface, said second mask defining a subchannel pattern;

e) etching said wafer through said second mask to form a subchannel in said wafer, said insertion channel and said subchannel being formed such that said insertion channel terminates in said subchannel; and f) inserting a capillary into said insertion channel such that said capillary is in fluid communication with said subchannel.

2. The method of claim 1, further comprising the step of securing to said wafer a capillary guide having a tapered guide channel for guiding said capillary into said insertion channel.

3. The method of claim 2, wherein said guide channel tapers to a diameter substantially equal to the diameter of said insertion channel.

4. The method of claim 2, wherein said guide channel tapers to a diameter smaller than the diameter of said insertion channel, and wherein said capillary is inserted into said insertion channel by press fitting said capillary through said capillary guide.

5. The method of claim 1, wherein the step of inserting said capillary into said insertion channel comprises the steps of:

a) thermally contracting said capillary until the outer diameter of said capillary is smaller than the diameter of said insertion channel;

b) inserting said capillary into said insertion channel; and c) thermally expanding said capillary after said capillary is inserted into said insertion channel.

6. The method of claim 5, wherein said insertion channel is formed such that the diameter of said insertion channel is smaller than the outer diameter of said capillary before said capillary is thermally contracted, and wherein said capillary is thermally expanded in said insertion channel to form a seal between said capillary and said wafer.

7. The method of claim 1, wherein said insertion channel is defined by tapered sidewalls, and wherein the step of inserting said capillary into said insertion channel comprises the step of press fitting said capillary between said tapered sidewalls.

8. The method of claim 1, further comprising the step of sealing said capillary to said wafer using an adhesive.

9. The method of claim 1, wherein said insertion channel and said subchannel are formed in said wafer such that said subchannel is substantially coaxial with said insertion channel.

10. The method of claim 1, wherein said wafer comprises a silicon substrate.

11. The method of claim 1, wherein said wafer is etched through said first and second masks using deep reactive ion etching.

12. The method of claim 1, further comprising the step of bonding said bottom surface of said wafer to a substrate having a fluid channel etched therein such that said subchannel is in fluid communication with said fluid channel.

13. The method of claim 12, wherein said bottom surface is bonded to said substrate using an adhesive.

14. The method of claim 12, wherein said substrate is a glass substrate and said bottom surface is anodically bonded to said glass substrate.

15. The method of claim 12, wherein said substrate is a silicon substrate and said bottom surface is fusion bonded to said silicon substrate.

16. The method of claim 1, wherein said microfluidic coupler comprises a double female microfluidic coupler and the method further comprises the steps of:

a) providing a second wafer having a second insertion channel and a second subchannel etched therein, said second insertion channel terminating in said second subchannel;

b) bonding said wafers to each other such that their respective subchannels are in fluid communication; and c) inserting a second capillary into said second insertion channel such that said second capillary is in fluid communication with said second subchannel.

17. A method for producing a microfluidic coupler, said method comprising the following steps:

a) producing a first mask on a top surface of a wafer, said first mask defining an insertion channel pattern;

b) etching said wafer through said first mask to form an insertion channel in said wafer;

c) producing a second mask on a bottom surface of said wafer, said second mask defining a subchannel pattern;

d) etching said wafer through said second mask to form a subchannel in said wafer, said insertion channel and said subchannel being formed such that said insertion channel terminates in said subchannel;

e) securing to said wafer a capillary guide having a tapered guide channel for guiding a capillary into said insertion channel; and f) inserting said capillary through said guide channel into said insertion channel such that said capillary is in fluid communication with said subchannel.

18. The method of claim 17, wherein said guide channel tapers to a diameter substantially equal to the diameter of said insertion channel.

19. The method of claim 17, wherein said guide channel tapers to a diameter smaller than the diameter of said insertion channel, and wherein said capillary is inserted through said guide channel into said insertion channel by press fitting said capillary through said capillary guide.

20. The method of claim 17, wherein the step of inserting said capillary through said guide channel into said insertion channel comprises the steps of:

a) thermally contracting said capillary until the outer diameter of said capillary is smaller than the diameter of said insertion channel;

b) inserting said capillary into said insertion channel; and c) thermally expanding said capillary after said capillary is inserted into said insertion channel.

21. The method of claim 20, wherein said insertion channel is formed such that the diameter of said insertion channel is smaller than the outer diameter of said capillary before said capillary is thermally contracted, and wherein said capillary is thermally expanded in said insertion channel to form a seal between said capillary and said wafer.

22. The method of claim 17, wherein said insertion channel is defined by tapered sidewalls, and wherein the step of inserting said capillary through said guide channel into said insertion channel comprises the step of press fitting said capillary between said tapered sidewalls.

23. The method of claim 17, wherein said wafer comprises a silicon substrate.

24. The method of claim 17, wherein said wafer is etched through said first and second masks using deep reactive ion etching.

25. The method of claim 17, wherein said insertion channel and said subchannel are formed in said wafer such that said subchannel is substantially coaxial with said insertion channel.

26. The method of claim 17, further comprising the step of bonding said bottom surface of said wafer to a substrate having a fluid channel etched therein such that said subchannel is in fluid communication with said fluid channel.

27. The method of claim 26, wherein said bottom surface is bonded to said substrate using an adhesive.

28. The method of claim 26, wherein said substrate is a glass substrate and said bottom surface is anodically bonded to said glass substrate.

29. The method of claim 26, wherein said substrate is a silicon substrate and said bottom surface is fusion bonded to said silicon substrate.

30. A method for producing a microfluidic coupler for use in coupling fluids into and out of a miniaturized system element, said system element comprising a substrate having a fluid channel etched therein, said method comprising the following steps:

a) producing a first mask on a top surface of a wafer, said first mask defining an insertion channel pattern;

b) etching said wafer through said first mask to form an insertion channel in said wafer;

c) producing a second mask on a bottom surface of said wafer, said second mask defining a subchannel pattern;

d) etching said wafer through said second mask to form a subchannel in said wafer, said insertion channel and said subchannel being formed such that said insertion channel terminates in said subchannel;

e) inserting a capillary into said insertion channel such that said capillary is in fluid communication with said subchannel; and f) bonding said bottom surface of said wafer to said substrate such that said subchannel is in fluid communication with said fluid channel.

31. The method of claim 30, further comprising the step of securing to said wafer and said substrate a capillary guide having a tapered guide channel for guiding said capillary into said insertion channel.

32. The method of claim 31, wherein said guide channel tapers to a diameter substantially equal to the diameter of said insertion channel.

33. The method of claim 31, wherein said guide channel tapers to a diameter smaller than the diameter of said insertion channel, and wherein said capillary is inserted into said insertion channel by press fitting said capillary through said capillary guide.

34. The method of claim 31, wherein said capillary guide has at least one leg for mounting said capillary guide to said wafer and said substrate, and wherein the step of securing said capillary guide to said wafer and said substrate comprises the steps of:

a) etching in said wafer a first mounting channel;

b) etching in said substrate a second mounting channel, said first and second mounting channels being etched such that when said wafer is bonded to said substrate, said first mounting channel is in communication with and substantially coaxial with said second mounting channel;

c) inserting said leg through said first and second mounting channels until an end of said leg protrudes from said second mounting channel; and d) melting the end of said leg to secure said capillary guide to said wafer and said substrate.

35. The method of claim 30, wherein the step of inserting said capillary into said insertion channel comprises the steps of:

a) thermally contracting said capillary until the outer diameter of said capillary is smaller than the diameter of said insertion channel;

b) inserting said capillary into said insertion channel; and c) thermally expanding said capillary after said capillary is inserted into said insertion channel.

36. The method of claim 35, wherein said insertion channel is formed such that the diameter of said insertion channel is smaller than the outer diameter of said capillary before said capillary is thermally contracted, and wherein said capillary is thermally expanded in said insertion channel to form a seal between said capillary and said wafer.

37. The method of claim 30, wherein said insertion channel is defined by tapered sidewalls, and wherein the step of inserting said capillary into said insertion channel comprises the step of press fitting said capillary between said tapered sidewalls.

38. The method of claim 30, further comprising the step of sealing said capillary to said wafer using an adhesive.

39. The method of claim 30, wherein said insertion channel and said subchannel are formed in said wafer such that said subchannel is substantially coaxial with said insertion channel.

40. The method of claim 30, wherein said wafer comprises a silicon substrate.

41. The method of claim 30, wherein said wafer is etched through said first and second masks using deep reactive ion etching.

42. The method of claim 30, wherein said bottom surface is bonded to said substrate using an adhesive.

43. The method of claim 30, wherein said substrate is a glass substrate and said bottom surface is anodically bonded to said glass substrate.

44. The method of claim 30, wherein said substrate is a silicon substrate and said bottom surface is fusion bonded to said silicon substrate.

45. A microfluidic coupler for coupling fluids into and out of a miniaturized system element, said system element comprising a substrate having a fluid channel etched therein, said microfluidic coupler comprising:

a) a wafer having an insertion channel and a subchannel etched therein such that said insertion channel terminates in said subchannel, said wafer being bonded to said substrate such that said subchannel is in fluid communication with said fluid channel;

b) a capillary inserted into said insertion channel such that said capillary is in fluid communication with said subchannel; and c) a capillary guide having a tapered guide channel for guiding said capillary into said insertion channel, said capillary guide being secured to said wafer such that said guide channel is in communication with and substantially coaxial with said insertion channel.

46. The microfluidic coupler of claim 45, wherein said guide channel tapers to a diameter substantially equal to the diameter of said insertion channel.

47. The microfluidic coupler of claim 45, wherein said guide channel tapers to a diameter smaller than the diameter of said insertion channel.

48. The microfluidic coupler of claim 45, wherein said wafer has a first mounting channel, said substrate has a second mounting channel in communication with and substantially coaxial with said first mounting channel, and said capillary guide has a leg inserted through said first and second mounting channels to secure said capillary guide to said wafer and said substrate.

49. The microfluidic coupler of claim 45, wherein said capillary guide comprises a plastic.

50. The microfluidic coupler of claim 45, wherein said insertion channel is defined by tapered sidewalls and said capillary is press fit between said tapered sidewalls.

51. The microfluidic coupler of claim 45, wherein said capillary is sealed to said wafer with an adhesive.

52. The microfluidic coupler of claim 45, wherein said subchannel is substantially coaxial with said insertion channel.

53. The microfluidic coupler of claim 45, wherein said wafer comprises a silicon substrate.

54. The microfluidic coupler of claim 45, wherein said wafer is adhesively bonded to said substrate.

55. The microfluidic coupler of claim 45, wherein said substrate is a glass substrate and said wafer is anodically bonded to said glass substrate.

56. The microfluidic coupler of claim 45, wherein said substrate is a silicon substrate and said wafer is fusion bonded to said silicon substrate.

* * * * *